Dec. 12, 1967     A. SCOTT     3,357,581
BOAT TRAILER
Filed Oct. 13, 1965     2 Sheets-Sheet 1
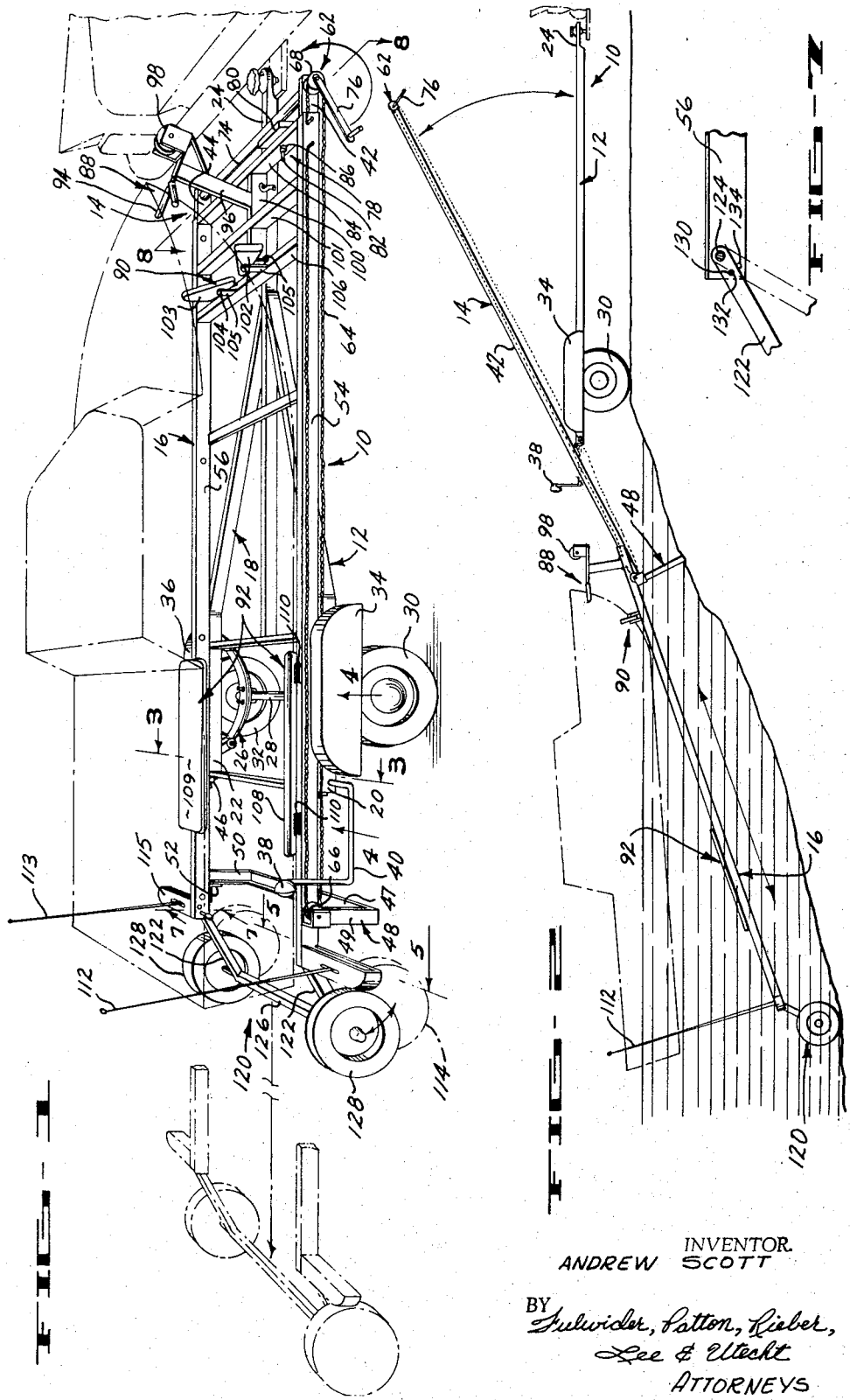
INVENTOR.
ANDREW SCOTT
BY Fulwider, Patton, Rieber, Lee & Utecht
ATTORNEYS

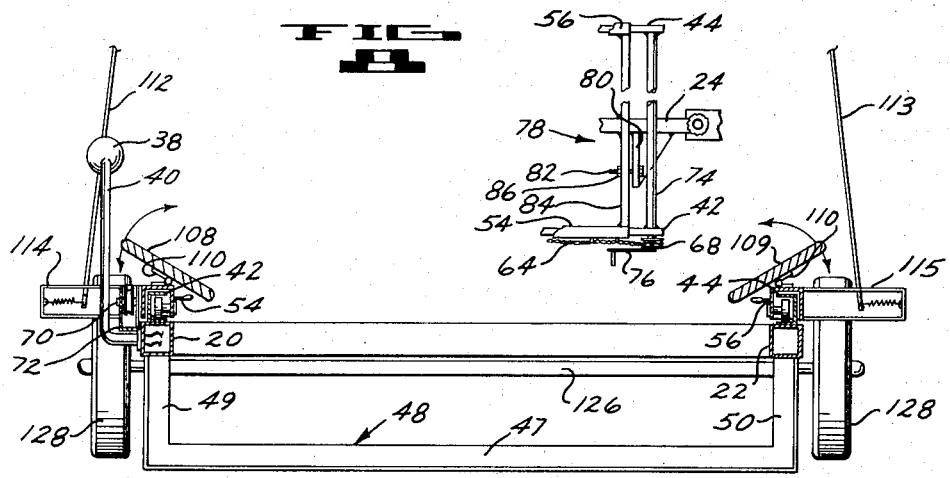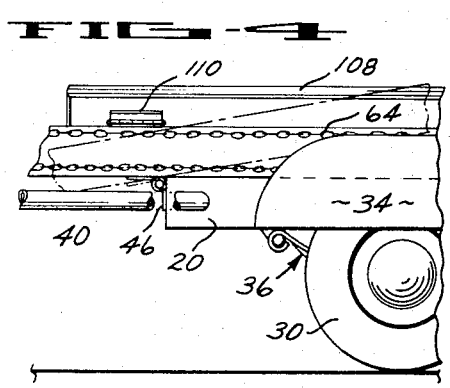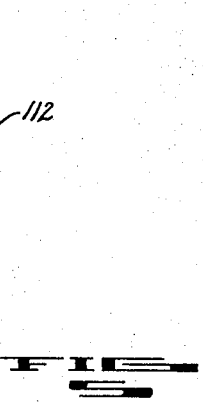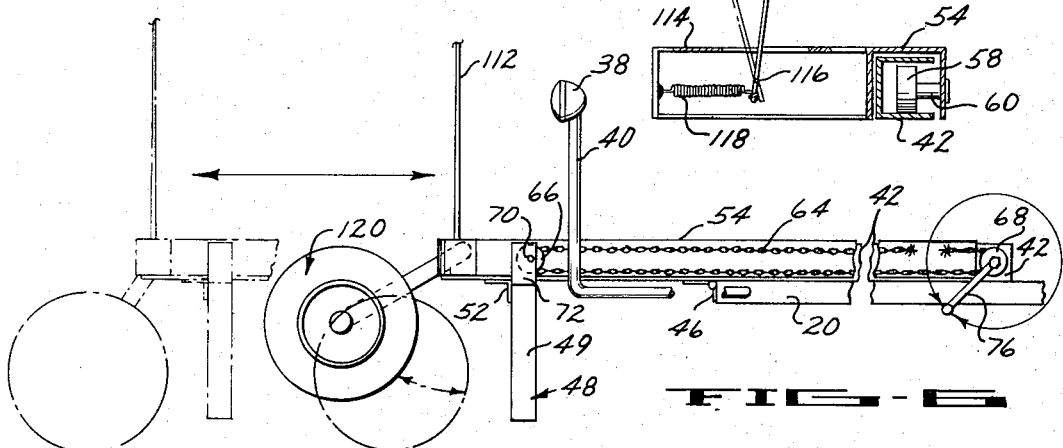

United States Patent Office 3,357,581
Patented Dec. 12, 1967

3,357,581
BOAT TRAILER
Andrew Scott, 7366 Bannock Trail,
Yucca Valley, Calif. 92284
Filed Oct. 13, 1965, Ser. No. 495,591
1 Claim. (Cl. 214—505)

ABSTRACT OF THE DISCLOSURE

A boat trailer comprising a first frame supported by a pair of wheels and including a forwardly extending tow bar for connection with a trailer hitch. A second frame is hinged from the first frame for swinging movement from a lowered position overlying the first frame to a raised rearwardly and downwardly inclined position. A third frame is supported rollably on the second frame and drive means is provided for selectively moving it therealong. Boat bottom support means are carried on the third frame. An auxiliary wheel assembly is carried by, and rearwardly of, the third frame and includes a wheel carried on a horizontal axle and means for releasably holding the wheel in a raised and lowered position.

The present invention relates to boat trailers and, more particularly, to an improved boat trailer which is adapted to carry boats of different size and to allow the launching thereof without requiring a main body of the trailer or its wheels to enter the water.

Conventional boat trailers comprise a metal, wheel-supported frame including a tow bar for connection to a trailer hitch, and a number of spaced boat bottom supporting rollers. The boat rests on top of the rollers and is secured to the frame by cables or ropes.

To launch the boat from the trailer, the trailer is backed into the water until it is almost entirely submerged. The cables are then loosened and the boat rolled over the rollers off the end of the frame into the water.

To reload the boat, the trailer is again driven into the water and the boat floated next to the frame. The boat is then pushed and pulled forward over the rollers and onto the frame. Generally, a cable and winch are used in pulling the boat up over the rollers.

Often, the underwater ground adjacent the shoreline slopes very gradually. In other places, it drops off rapidly. In both locations it is very difficult to launch and reload a boat from a conventional trailer. When the ground slopes gradually, it is necessary to drive the trailer far into the water to reach the water depth necessary to launch the boat. This means that the vehicle pulling the trailer must either be driven into the water, with the risk of water damage to the vehicle or of sticking of the vehicle in the water, or that the trailer must be disconnected from the vehicle and hand-maneuvered into the water.

When the ground drops off rapidly, the trailer cannot be backed into the water while connected to the vehicle. This means that the trailer must either be disconnected from the vehicle and hand-maneuvered into the water or driven only to the edge of the steep incline and the boat rolled rearwardly down the frame and literally dropped into the water. Needless to say, neither alternative is satisfactory. Also, under such conditions, it is extremely difficult to reload the boat onto the trailer.

Also, the repeated submerging of the trailer is very hard on the bearings and other metal supporting structures for the trailer wheels. This is particularly the case where the trailer is repeatedly submerged in salt water. Ordinary water spraying of the trailer after use does not remove all salt from the under-carriage and wheels of the trailer and the salt residue attacks the metal of the trailer and particularly the moving parts thereof. For this reason, the wheel bearings of conventional trailers require frequent repacking and the axle should be greased at regular intervals. This is very annoying to most boat owners and may become a rather expensive proposition.

Another shortcoming of conventional trailers is that they are usually designed to carry boats of a single bottom shape. This severely limits the utility of conventional boat trailers and usually requires the boat owner to trade in or sell his trailer when purchasing a new or different boat.

Accordingly, it is an object of the present invention to provide an improved trailer which is capable of launching and reloading a boat over underwater ground of widely differing slope with relatively little effort on the part of the boat owner.

A further object of the present invention is to provide a boat trailer capable of carrying boats of different bottom shapes.

Still another object of the present invention is to provide a boat trailer which allows the boat owner to launch and reload his boat without driving the wheels of the trailer into the water or submerging the under-carriage of the trailer.

A still further object of the present invention is to provide a boat trailer which is simple and reliable in its operation, and which may be inexpensively manufactured.

The foregoing as well as other objects and advantages of the present invention may be more clearly understood by reference to the following detailed description when taken with the drawings which, by way of example only, illustrate one form of boat trailer embodying the features of the present invention.

In the drawings:

FIGURE 1 is a perspective view of the boat trailer with the rear end of the vehicle pulling the trailer and the boat carried thereby shown in phantom outline;

FIGURE 2 is a schematic side view of the trailer in a boat launching and reloading position;

FIGURE 3 is a sectional view taken along the line 3—3 in FIGURE 1;

FIGURE 4 is a fragmentary side view of the trailer taken along the line 4—4 in FIGURE 1;

FIGURE 5 is a sectional view taken along the line 5—5 in FIGURE 1;

FIGURE 6 is a fragmentary side view of the frame structure of the boat trailer with portions broken away and removed;

FIGURE 7 is a fragmentary sectional view taken along the line 7—7 in FIGURE 1; and FIGURE 8 is a fragmentary top view taken along the line 8—8 in FIGURE 1.

In the drawings, the boat trailer is represented generally by the numeral 10 and comprises a first or main frame 12, a second or tiltable frame 14, and a third or traveling frame 16. The main frame 12 is adapted to be towed over the ground by a vehicle while the traveling frame 16 is adapted to carry a boat.

Briefly, to launch a boat from the trailer 10, the trailer is first backed to the edge of the water and the traveling frame 16 moved rearward along the tiltable frame 14. As the traveling frame and boat extend rearward over the tiltable frame, the rear end of the tiltable frame swings downwardly to slip the boat into the water. The boat then floats free of the trailer and is disconnected therefrom.

To reload the boat onto the trailer 10, the trailer is again driven back to the edge of the water and the traveling frame 16 extended rearward from the tiltable frame 14 until it is submerged in the water. Next, the boat is floated over the traveling frame and secured to the front end thereof. The traveling frame 16 is then returned over the tiltable frame 14 which lowers to its original horizontal position as the boat and traveling frame travel thereover. Once the traveling frame is again over the tiltable frame, the trailer can be driven away from the water.

From the foregoing brief description, it is appreciated that during both the boat launching and reloading operation, the main body of the trailer 10, including its wheels and under-carriage, do not contact the water. Also, due to the tiltable nature of the frame 14, the boat may be launched and reloaded over underwater terrain of varying slopes without appreciably affecting the physical effort required to launch or reload the boat.

Referring more particularly to the drawings and specifically to FIGURE 1, the main frame 12 includes a generally V-shaped, horizontal mid-portion 18 having parallel side members 20 and 11 extending rearward from the ends of the mid-portion, and an elongated tow bar 24 extending forward from the apex of the mid-portion for connection to a trailer hitch. A pair of conventional spring assemblies 26 extend downwardly from the parallel side members 20 and 22 of the main frame 12 and carry an axle 28 which, in turn, supports a pair of wheels 30 and 32 on opposite ends thereof for rolling over the ground. Fenders 34 and 36 extend from the outside of the parallel side members 20 and 28 over the wheels 30 and 32 to prevent mud and other debris from splashing upward over the trailer and onto the boat.

Preferably, the members comprising the main frame 12 are formed of tubular metal stock adapted to receive and support insulated wiring of the lightning system for the trailer 10. As illustrated in FIGURE 1, the lightning system includes a tail light 38 mounted on the upper end of a pipe 40. The pipe 40 is connected at one end to the rear portion of the side member 20 and extends outwardly therefrom, then rearwardly beyond the main frame 12 and upwardly to a position approximately two feet above the top of the main frame. There the pipe 40 connects to and supports the tail light 38 for clear viewing from the rear of the trailer 10.

The tiltable frame 14 includes a pair of spaced, parallel side members 42 and 44 each having a generally U-shaped cross section with the open side of the U facing inwardly toward the other of the side members (see FIGURES 3 and 5). The side members 42 and 44 are connected by a pair of hinges 46 to the rear end of the parallel side members 20 and 22, respectively, and extend over and along the parallel side members both forward toward the front of the boat trailer 10 and rearwardly beyond the hinges. Thus supported, tiltable frame 14 is adapted to swing between a horizontal, open road position over the main frame 12 (see FIGURE 1) and a rearwardly and downwardly inclined boat launch and load position (see FIGURE 2). In the inclined position, the flat bottom 47 of a brace member 48 engages the ground below the trailer to limit further upward swinging movement of the tiltable frame 14. The brace member 48 is generally U-shaped, including the flat bottom 47 and a pair of vertical side arms 49 and 50 connected to the underside of the side members 42 and 44, respectively, by brackets 52.

The traveling frame 16 extends over and along the tiltable frame 14 and is movable relative thereto. In this respect, the frame 16 includes a pair of spaced, parallel side members 54 and 56 each having an inverted U-shaped cross section (see FIGURE 5). The side members 54 and 56 extend around and along the side members 42 and 44, respectively, of the tiltable frame 14 with a plurality of rollers 58 connected by shafts 60 to the innermost side of the side members 54 and 56 and extending outward to roll over the bottom of the side members 42 and 44. The rollers 58 thus provide for easy, longitudinal movement of the traveling frame 16 back and forth along the tiltable frame 14 during the boat launching and reloading operations.

To selectively control the movement of the traveling frame 16, the boat trailer 10 includes a drive assembly 62. In the illustrated form, the drive assembly 62 comprises a chain drive including a length of chain 64 connected at both ends to a front end portion of the side member 54 of the traveling frame 16, and extending around an idler pulley 66 and a drive pulley 68. The idler pulley 66 is supported for rotation about a horizontal shaft 70 carried by the bifurcated upper end of mounting bracket 72 extending outwardly from the top of the brace 48 (see FIGURES 1, 3 and 6). As best illustrated in FIGURES 1 and 8, the drive pulley 68 is connected to a shaft 74 extending between front end portions of the side members 42 and 44 of the tiltable frame 14, and has a hand crank 76 connected thereto. A turning of the crank 76 turns the drive pulley 68 to pull the chain 64 therearound and move the traveling frame 16 along the tiltable frame 14 in a direction determined by the direction of rotation of the crank.

In order to prevent undesired movement of the traveling frame 16 along a tiltable frame 14, particularly when the trailer 10 is hauling a boat, a releasable lock assembly 78 is included for releasably connecting the traveling frame to the main frame 12. In the illustrated form of the boat trailer, the lock assembly 78 comprises a plate 80 connected to the side of the tow bar 24 and a bolt 82 for extending through aligned openings in the plate and a cross member 84 of the traveling frame to threadedly receive a nut 86. With the bolt 82 in place, the traveling frame 16 is held over the tiltable frame 14 and the tiltable frame is held down over the main frame thereby preventing movement of either the tiltable or traveling frames relative to the main frame when the trailer 10 is hauling a boat.

To enable the trailer 10 to support a boat, the traveling frame 16 carries a bow stop 88, a bow support 90, and a bottom support 92. The bow stop 88 facilitates the positioning of the bow of a boat on the trailer and is of conventional form comprising a rubber or plastic covered V-shaped stop member 94 extending rearwardly from a vertical 96 which also carries a conventional boat winch 98 for use in pulling a boat onto the traveling frame. The vertical 96 is supported at its lower end upon a forwardly extending support member 100 of the traveling frame over the tow bar 24 between the cross member 84 and a cross member 101.

The bow support 90 comprises a pair of generally triangular blocks 102 and 103 evenly spaced on opposite sides of the tow bar 24 just to the rear of the bow stop 88. The blocks are stationed on edge and are adapted to support the bow of different size boats. To this end, the blocks 102 and 103 are pivotally supported on pins 104 extending horizontally through mid-portions of the blocks and vertical plates 105 which extend upwardly on opposite sides of the blocks from the top of a cross member 106 of the traveling frame 16. Thus connected, the blocks 102 and 103 are able to tilt inwardly toward each other to follow the bottom contour and support the bow of different size and shape boats.

The bottom support 92 includes a pair of forwardly extending planks 108 and 109 covered with a resilient, long-lasting and durable material. Mid-portions of the planks 108 and 109 are connected by hinges 110 to the side members 54 and 56 of the traveling frame 16 to tilt inwardly with the innermost opposing edges of the planks generally parallel to each other. Thus connected, the planks are adapted to follow and support the bottom of different size and shape boats and combine with the tiltable blocks 102 and 103 to allow the trailer 10 to be used to carry boats having different bottom shapes.

To provide means for guiding a boat onto the center of the trailer 10, when the traveling frame 16 is submerged, the boat trailer includes a pair of vertically extending, and resilient guide rods 112 and 113 for indicating the location of the submerged frame and the position of the side members 54 and 56 thereof. Lower ends of the rods extend through elongated lateral holes in a pair of hollow lateral extensions 114 and 115 connected to the outside of rear portions of the side members 54 and 56. As illustrated in FIGURE 5 for the rod 112, within the extensions 114 and 115, the rods are connected to turn about pins 116 and the tops of the rods are urged toward the center of the trailer by coil springs 118 connected to the bottom of the rods and to the insides of the hollow extensions. Thus supported, the rods "give" with lateral movement of a boat thereagainst during loading, and provide a visual indication of the position of the outer edges of the submerged frame to indicate the proper path for floating the boat onto the center of the traveling frame.

To support the rear end of the traveling frame when in the boat launch and reload position, the boat trailer 10 preferably includes an auxiliary wheel assembly 120. In the illustrated form, the auxiliary wheel assembly 120 comprises a pair of arms 122 pivotally connected by pins 124 to the rear end portions of the side members 54 and 56 of the traveling frame. The arms 122 carry a horizontal axle 126 which extends therebetween to rotationally support a pair of auxiliary wheels 128 in a conventional manner. The wheels 128 and the connection means therefor to the axle 126 may be of a very simple and inexpensive design since the auxiliary wheel assembly 120 is only used during the final stage of the boat launch and the initial stage of the boat reloading operations.

In particular, when the boat trailer 10 is in its open road condition, the auxiliary wheel assembly 120 is raised and held in place by removable pins 130 which extend through aligned holes 132 in the arms 122 and in the side members 54 and 56 (see FIGURE 7). It is only when the boat carried by the trailer is to be launched or reloaded that the wheel assembly 120 is lowered. To accomplish this, the removable pins 130 are slipped from the holes 132 and the arms 122 lowered to bring the holes in the arms into alignment with a pair of holes 134 in the side members 54 and 56. The pins 130 are then reinserted to hold the arms 122 in place and the wheels 128 in a lowered position. Then as the traveling frame 16 is moved rearward along the tiltable frame 14 and the tiltable frame tilts downward under the shifting weight of the boat, the auxiliary wheels 128 contact the ground under the water to provide rolling support for the rear end of the traveling frame thereover.

By way of summary and review, to launch a boat from the boat trailer 10, a boat owner first backs the trailer adjacent the body of water into which the boat is to be launched. He then lowers the auxiliary wheel assembly 120, disconnects any cables or ropes holding the boat to the trailer, and removes the bolt 82 from the plate 80 to allow for longitudinal movement of the traveling frame 16 over the tiltable frame 14 and tilting movement of the tiltable frame relative to the main frame 12. Next, by turning the hand crank 76, the boat owner causes the chain 64 to pull the traveling frame 16 rearwardly along the tiltable frame 14 with the rollers 58 riding within the side members 42 and 44 of the tiltable frame. As the traveling frame and boat move rearward over the hinges 46 connecting the tiltable frame 14 to the main frame 12, the front end of the tiltable frame begins to swing upwardly to tilt the traveling frame downwardly with the boat. As the traveling frame tilts downwardly, the auxiliary wheels 128 engage the ground under the water and roll thereover as the traveling frame continues to move rearwardly upon a further turning of the hand crank. As the traveling frame submerges under the water, the boat carried thereby floats free of the boat trailer. Alternatively, the boat may be pushed rearwardly from the traveling frame as the frame enters the water.

With the boat free of the trailer, the hand crank 76 is turned in an opposite direction to pull the traveling frame 16 back up over and along the tiltable frame 14. As the traveling frame moves over the hinge 46, the front end of the tiltable frame swings downward to its horizontal position carrying the traveling frame therewith. Continued turning of the hand crank then returns the traveling frame to its original position where it is again attached to the main frame 12 by connection of the bolt 82 to the plate 80. The auxiliary wheel assembly may then be again raised and the trailer towed away until such time as it is desired to reload the boat onto the trailer.

To reload the boat onto the trailer 10, the initial operation of the trailer is as before with the trailer being backed adjacent the water, the auxiliary wheel assembly 120 lowered and the traveling frame 16 disconnected from the main frame 12 and moved rearwardly along the tiltable frame 14 into the water with the auxiliary wheel assembly engaging the ground. In this position, the guide rods 122 and 133 extend upwardly from the traveling frame and are visible above the water. This provides a guide for the boat owner in steering his boat onto the center of the traveling frame 16. In particular, the boat owner floats the boat over the traveling frame centrally between the guide rods 112 and 113 until the bow of the boat mates with the V-shaped bow stop 94. The floating of the boat onto the movable frame may be assisted by a cable connected to the winch 98. The boat is then secured as by a cable or rope to the frame 16 and the hand crank 76 turned to pull the traveling frame upward over the tiltable frame 14. As this occurs, the blocks 102 and 103 and planks 108 and 109 engage and support the bottom of the boat over the traveling frame. As the boat moves upwardly with the traveling frame over the hinges 46, the tiltable frame 14 again swings to its horizontal position and further turning of the hand crank draws the traveling frame and boat over the tiltable frame to its original position. The traveling frame is then again secured to the main frame as before and the auxiliary wheel assembly raised readying the boat trailer 10 for open road hauling of the boat.

From the foregoing description, it is appreciated that the present invention provides an improved boat trailer which facilitates the loading and launching of boats. Furthermore, boats of various size and shape may be carried by the trailer and may be launched into water over grounds of different slopes without requiring the main wheels and under-carriage of the trailer to enter the water.

While a particular form of boat trailer has been described in some detail herein, changes and modifications may be made in the illustrated form without departing from the spirit of the present invention. It is therefore intended that the present invention be limited in scope only by the terms of the following claim.

I claim:

A boat trailer comprising:
a first frame carrying a pair of wheels for rolling over the ground and including a tow bar for connection to a trailer hitch;
a second frame including a pair of spaced, parallel side members;
hinge means connecting said second frame for limited swinging movement relative to said first frame between a horizontal, lowered position over said first frame and a rearwardly and downwardly inclined, raised position;
a third frame including a pair of spaced, parallel side members;
roller means between said side members of said side members of said second and third frames for supporting said third frame for longitudinal movement along said second frame;
boat bottom supporting means carried by said third frame;
drive means for selectively moving said third frame along said second frame;
an auxiliary wheel assembly, including;
a pair of arms pivotally connected to and extending rearwardly from said side members of said third frame for swinging movement in generally vertical planes;
a horizontal axle carried by said arms;
a wheel carried by said axle;
and means for releasably holding said wheel in raised and lowered positions.

References Cited

UNITED STATES PATENTS

| | | | |
|---|---|---|---|
| 2,745,566 | 5/1956 | Bouffard | 214—505 |
| 2,938,642 | 5/1960 | Felix | 214—505 |
| 3,011,670 | 12/1961 | Chatterton et al. | 214—505 |
| 3,021,969 | 2/1962 | Peake et al. | 214—505 X |
| 3,056,520 | 10/1962 | Rutigliano | 214—505 |
| 3,058,756 | 10/1962 | Holsclaw | 214—506 X |
| 3,138,271 | 6/1964 | De Lay et al. | 214—84 X |
| 3,140,003 | 7/1964 | Horner | 214—505 |
| 3,214,046 | 10/1965 | Dempster et al. | 214—505 |

GERALD M. FORLENZA, *Primary Examiner.*

ALBERT J. MAKAY, *Examiner.*